United States Patent [19]
Kato et al.

[11] 4,062,439
[45] Dec. 13, 1977

[54] APPARATUS FOR TRANSPORTING YARN PACKAGES PRODUCED BY A TEXTILE MACHINE

[75] Inventors: Takashi Kato, Kariya; Toshio Yoshizawa, Chiryu; Yoshihisa Suzuki, Nagoya; Shozo Ueda, Kariya, all of Japan

[73] Assignees: Kabushiki Kaisha Toyoda Jidoshokki Seisakusho; Daiwa Boseki Kabushiki Kaisha, Osaka, both of Japan

[21] Appl. No.: 660,827

[22] Filed: Feb. 24, 1976

Related U.S. Application Data

[62] Division of Ser. No. 435,948, Jan. 23, 1974, Pat. No. 3,946,884.

[30] Foreign Application Priority Data

Jan. 23, 1973 Japan .................................. 44-9662
May 17, 1973 Japan .................................. 45-55027
June 26, 1973 Japan .................................. 45-72066

[51] Int. Cl.² .......................................... B65G 47/04
[52] U.S. Cl. ...................................... 198/470; 198/491
[58] Field of Search ................. 214/8, 41; 198/651, 198/491, 469, 470

[56] References Cited

U.S. PATENT DOCUMENTS

| | | | |
|---|---|---|---|
| 3,531,016 | 9/1970 | Pray | 198/651 X |
| 3,712,449 | 1/1973 | Holovnia et al. | 198/651 X |

*Primary Examiner*—Robert G. Sheridan
*Attorney, Agent, or Firm*—Burgess, Ryan and Wayne

[57] ABSTRACT

An apparatus for transporting yarn packages wound on cylindrical tubes from a process where the yarn packages are produced by textile machines to a subsequent process without touching any yarn layer thereof. A conveyer belt is disposed along the lengthwise direction of the above-mentioned textile machine so as to receive the yarn packages from the textile machine and the yarn packages are received by respective receiving rods which are utilized for carrying the yarn packages to the subsequent process. An auxiliary device for regulating the lengthwise direction of the tube of each yarn package in a condition of alignment with the receiving rod is disposed between the conveyer belt and the position where the receiving rod is capable of receiving the yarn package.

6 Claims, 20 Drawing Figures

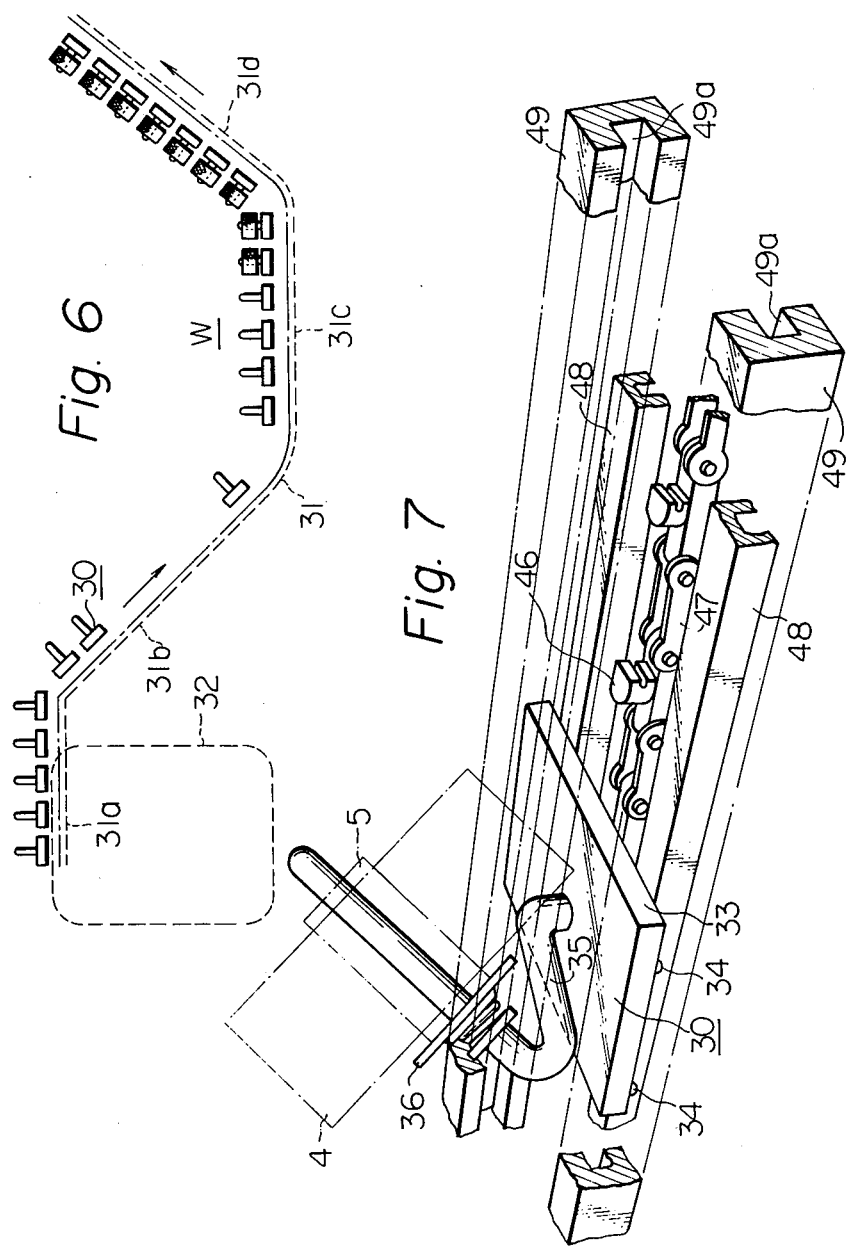

APPARATUS FOR TRANSPORTING YARN PACKAGES PRODUCED BY A TEXTILE MACHINE

SUMMARY OF THE INVENTION

The present application is a divisional patent application of the pending patent application Ser. No. 435,948, filed on Jan. 23, 1974, now U.S. Pat. No. 3,946,884, and this invention relates to an automatic apparatus for transporting yarn packages wound on cylindrical tubes from a process where the yarn packages are produced by textile machines to a subsequent process without touching any yarn layer thereof.

In an open-end spinning process, it is advantageous if the yarn packages produced by the process are doffed onto a conveyor disposed in close proximity to an open-end spinning frame or a group of open-end spinning frames so as to be carried toward a terminal of the conveyor belt and then transferred to a transportation carrier or a subsequent conveyor. Since the yarn package is formed on a cylindrical tube, it is desirable that the yarn layers of the yarn packages not be touched during movement of the packages, so as to prevent damage to the yarn package.

The principal object of the present invention is to provide a unique method and apparatus for transporting yarn packages wound on cylindrical tubes from a process where the yarn packages are produced to a subsequent process without touching or gripping any yarn layer thereof so as to prevent damage to the yarn package.

To attain the above-mentioned purpose, in the present invention, the yarn packages are handled at a receiving rod or like member in such a manner that the receiving rod is inserted into the cylindrical tube of one or more of the yarn packages when the yarn packages are transferred from the conveyor belt, which carries the yarn packages doffed from the textile machines, to the subsequent process. For example, in case of application of the present invention to the open-end spinning process, wherein a conveyor belt is utilized for carrying the yarn packages doffed from the open-end spinning machines and the yarn packages are transferred from the conveyor belt to a transportation carrier, the transportation carrier means is provided with a receiving rod. The receiving rod is so designed that a free end thereof is capable of facing the bore of the cylindrical tube of a yarn package leaving the conveyor belt. To assure the above-mentioned transfer operation from the conveyor belt to the receiving rod, an auxiliary conveyor belt is disposed between the conveyor belt and the transporting carrier means so as to automatically adjust the carrying direction of the yarn package toward the receiving rod. Consequently, when the conveyor belt is driven so as to carry the yarn packages, the cylindrical tubes of the yarn packages carried to the terminal of their carrying passage on the conveyor belt are adjusted in the axial direction so as to align them with the longitudinal direction of receiving rod.

Instead of the above-mentioned transportation carrier means, an conveyor composed of a plurality of carrying members provided with a receiving rod for receiving a single yarn package can be utilized in a manner similar to the above-mentioned receiving rod of the transportation carrier means.

BRIEF EXPLANATION OF THE DRAWINGS

FIG. 6 is a schematic side view of a transportation conveyer according to the present invention;

FIG. 7 is a perspective view of a part of the transportation conveyer shown in FIG. 6;

DETAILED DESCRIPTION OF THE INVENTION

Figure 1:
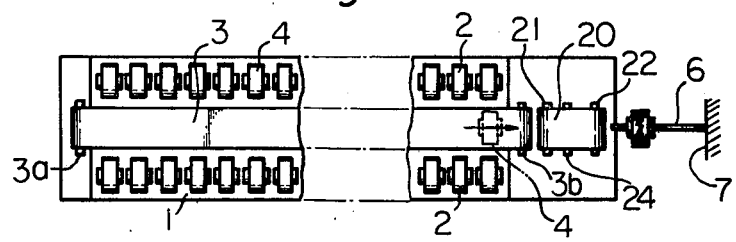
FIG. 1 is a schematic plan view of an open-end spinning frame provided with a transportation apparatus according to the present invention.
Figure 2:
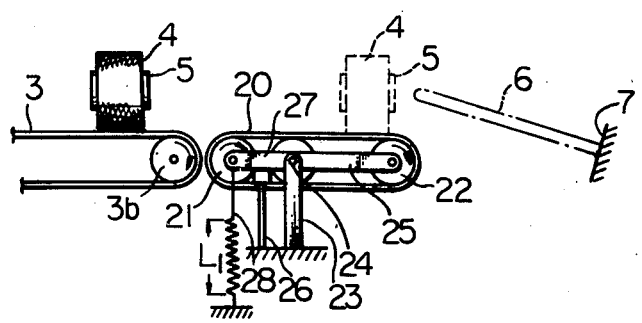
FIGS. 2 and 3 are schematic side views of a part of the transportation apparatus shown in FIG. 1, showing the working function thereof.
Figure 3:
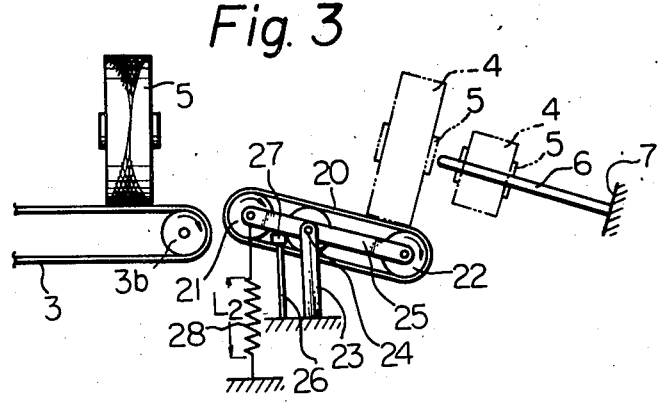
Figure 5:
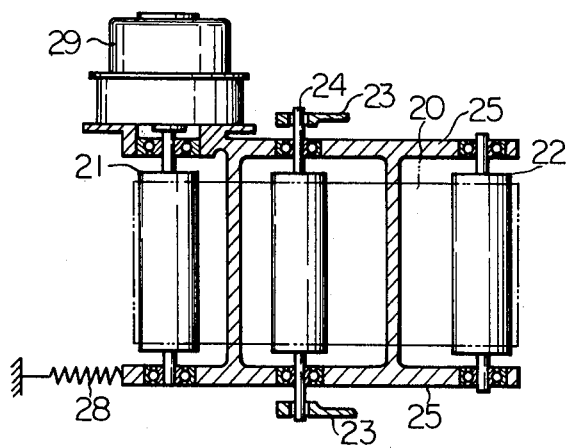
FIG. 5 is a schematic elevation of a part of the transportation apparatus shown in FIG. 3.

Referring to FIGS. 1, 2 and 5, in an open-end spinning frame 1 provided with a plurality of spinning units 2 aligned in a row at each longitudinal side of the spinning frame 1, an endless conveyer belt 3 is disposed above a main frame (not shown) of the spinning frame 1 in the intervening space between the two rows of spinning units 2. The conveyer belt 3 is positively driven by a driving roller 3a at one end of the spinning frame 1, while a guide roller 3b for the conveyer belt 3 is disposed at the other end portion of the spinning frame 1. The waiting position of a receiving rod 6 of a transportation carrier 7 is maintained at a predetermined position which is suitable to receive a yarn package 4. However, in spinning operations, it is impossible to produce yarn packages having an equal size, because it is impossible to prevent yarn breakages during the spinning operation. Consequently, it is impossible to receive yarn packages 4 having different sizes on the receiving rod 6 of the transportation carrier 7 which is located at a predetermined fixed position. To eliminate the above-mentioned problem, in the device according to the present invention shown in FIGS. 1, 2, 3 and 5, an auxiliary transfer means is utilized. That is, the auxiliary transfer means comprises an endless belt 20 which is turnably supported by a driving roller 21 and a guide roller 22 and a pair of supporting brackets 25 which support the driving roller 21 and the guide roller 22 in rotatable condition. The brackets 25 are turnably mounted on a pair of vertical brackets 23 secured to a part of the machine frame by way of a horizontal shaft 24.

A tension spring 28 connects an end of the bracket 25 with the machine frame so as to urge the brackets 25 to turn in a counterclockwise direction (in FIG. 2) about the shaft 24. However, the above-mentioned counterclockwise turning motion of the brackets 25 is restricted by a stopper 26 which is secured to the machine frame. At a tip portion of the stopper, there is provided a limit switch 27 which detects the pushing of the bracket 25 against the limit switch 27 according to the counterclockwise turning motion of the brackets 25 (in FIG. 2). The positions of the limit switch 27 and the shaft 24 are so selected that when the bracket 25 contacts the limit switch 27, the brackets 25 are positioned in the horizontal condition. In this horizontal condition of the brackets 25, the upper surface of the conveyer belt 3 coincides with the upper surface of the endless belt 20. A motor 29 is mounted on the bracket 25 as shown in FIG. 5 so as to drive the driving roller 21.

Figure 4:
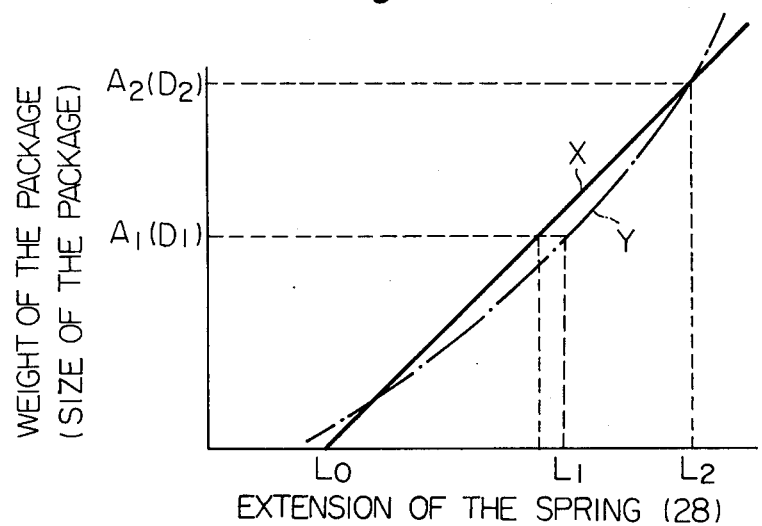
FIG. 4 is an explanation diagram showing the relationship between the extension of the spring utilized for the transferring device shown in FIG. 1 and the weight (size) of a yarn package.

When a yarn package 4 is carried to the terminal of the conveyer belt 3, the yarn package 4 is transferred to the endless belt 20 from the conveyer belt 3. As the endless belt 20 is driven by the driving roller 21, the yarn package 4 is carried toward the receiving rod 6. When the package 4 is carried over the horizontal shaft 24, the brackets 25 are turned clockwise (in FIGS. 2 and 3) about the shaft 24 according to the weight of the yarn package 4. This turning motion of the brackets 25 is created against the counter action of the spring 28. Consequently, the position of the brackets 25 in the balanced condition between the weight of the yarn package 4 and the spring 28 when the yarn package 4 is carried to the terminal position of the endless belt 20 varies according to the weight of the yarn package 4. According to our experimental tests, the relation between the weight of the yarn package 4 and the extension of the spring 28 can be represented by a linear line X shown in FIG. 4, while the relation between the weight of the yarn package 4 and the size (diameter) of the yarn package 4 can be represented by a curved line which is quite similar to a linear line. Consequently, the relation between the package size (diameter) and the extension of the spring (28) can be approximately represented by a linear line, in other words, the extension of the spring 28 can be controlled in linear relationship with the variation of the package size. If the position of the receiving rod 6 of the transportation carrier 7 is so selected that the tip of the receiving rod 6 faces the cylindrical bobbin 5 whereon the yarn package 4 is formed, all of the yarn packages 4 can be received by the receiving rod 6.

To clarify the above-mentioned positioning function of the transfer means, in the drawings of FIGS. 2, 3, 4 and 5, providing that the extension of the spring 28 when a yarn package 4 having a full size ($D_2$) is displaced to the transportation terminal of the endless belt 20 is represented by ($L_2$), and the weight of this yarn package 4 is represented by ($A_2$), while the extension of the spring 28 when a yarn package 4 having a smaller size ($D_1$) than the full package is displaced to the transportation terminal of the endless belt 20 is represented by ($L_1$) and the weight of this yarn package 4 is represented by ($A_1$), the initial length of the spring 28 is represented by ($L_0$); the actual curve Y representing the relation between the extension of the spring 28 and the package size can be made similar to the linear curve X, if a suitable spring is utilized.

With a practical transfer means, it is essential to prevent simultaneous double feed of the yarn packages on the endless belt 20. Consequently, the driving of the conveyer belt 3 is carried out intermittently by utilizing a conventional step driving mechanism (not shown). To drive the step driving mechanism, the limit switch 27 is utilized for this embodiment. That is, when the yarn package 4 on the endless belt 20 is transferred to the receiving rod 6, the bracket 25 is turned counterclockwise in FIG. 2 by the action of the spring 28, and the bracket 25 contacts the limit switch 27. Then the limit switch 27 actuates the step driving mechanism so as to transfer a yarn package 4 to the endless belt 20.

Figure 8:
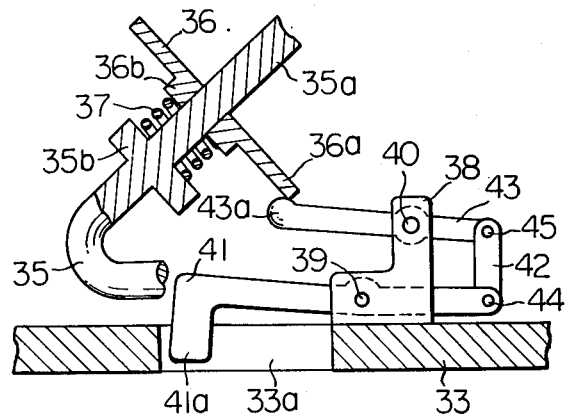
FIG. 8 is a schematic side view, partly in section, of a unit member of the transportation conveyer shown in FIG. 6.
Figure 9:
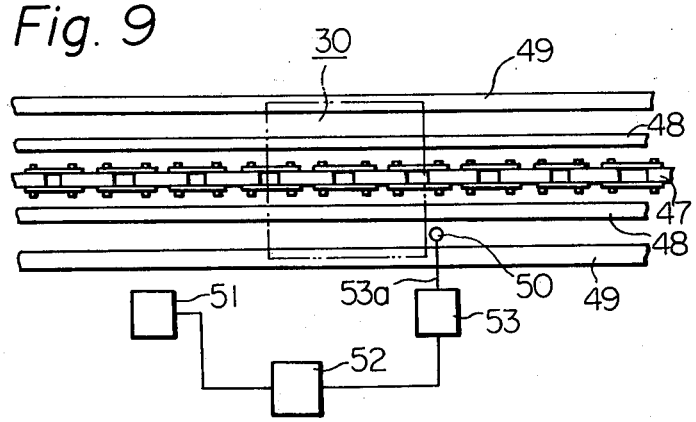
FIG. 9 is a schematic elevation of a package transfer station of the transportation conveyer shown in FIG. 6.
Figure 10:
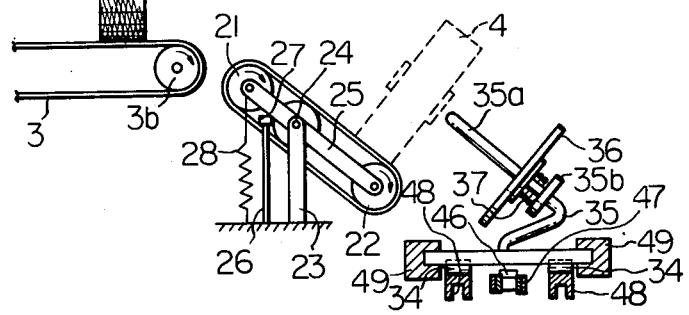
FIG. 10 is a schematic side view of a unit member of the transportation conveyer, at the package transfer station shown in FIG. 6.

In FIGS. 6, 7, 8, 9 and 10, another embodiment of the transportation apparatus according to the present invention is shown. In this embodiment, every receiving rod is mounted on a carrier which is conveyed by an endless conveyer which runs through the yarn package making process and the successive process. Referring to FIG. 6, a plurality of carriers 30 are carried by an endless conveyer 31 which is arranged so as to pass a transfer station W where the full packaged yarn packages 4 are transferred from the conveyer belt 3 to the carrier 30. Except at a portion facing the transfer station W, the endless conveyer 31 passes above the spinning machinery 1. Each carrier 30 from which a yarn package has been removed in the preceding process (hereinafter referred to as an empty carrier) is displaced to a passage 31a of the conveyer 31 by means of another endless chain conveyer 32. When the empty carriers 30 are moved to an inclined passage 31b of the conveyer 31, which is inclined from the overhead portion 31a to a transferring passage 31c facing the transfer station W, the carriers 30 can slide downward along a pair of guide rails of the conveyer 31, and when the carriers 30 are displaced to the passage 31c of the conveyer 31, each preceding carrier 30 is pushed forward by a subsequent carrier 30. When a yarn package 4 is transferred from the conveyer belt 3 to the receiving rod of the carrier 30, an engaging element (not shown) engages a hook member of the conveyer 31 so that the carrier 30 holding a yarn package 4 is positively displaced along an inclined passage 31d so that the carrier 30 is displaced toward the overhead passage of the conveyer 31 and transported to a successive process. Referring to FIGS. 7 and 8, the carrier comprises a carrier plate 33 provided with a pair of rollers 34 turnably held on the underside thereof, a bent receiving rod 35 provided with a straight inclined portion 35a and a laterally expanded portion 35b formed near the bottom of the straight inclined portion 35a, a flange 36 slidably mounted on the straight inclined portion 35a and a compression spring 37 disposed between the expanded portion 35b and the flange 36 so as to always urge the flange 36 upward. The carrier plate 33 is provided with a cut out portion 33a and a bracket 38 is rigidly mounted on the carrier plate 33 as shown in FIG. 8. A hook lever 41 is turnably mounted on a pivot shaft 39 secured to the bracket 38 and another lever 43 is turnably mounted on a pivot shaft 40 also secured to the bracket 38. The levers 41 and 43 are connected by a link 42 by way of pins 44 and 45. The hook lever 41 is provided with a hook 41a at the free end portion thereof in such a way that the hook 41a is capable of projecting downward beyond the lower surface of the carrier plate 33 when the lever 41 turns counterclockwise about the pivot shaft 39 (in FIG. 8), and, the lever 43 is provided with an expanded portion 43a formed at the free end thereof in such a condition that when the flange 36 is displaced downward, an edge portion 36a of the flange 36 pushes the expanded portion 43a of the lever 43 so that the hook lever 41 is turned counterclockwise (in FIG. 8) about the pivot shaft 39. The conveyer 31 comprises an endless chain 47 provided with a plurality of hook members 46 and a pair of first guide rails 48 disposed at both sides of the endless chain 47, so as to guide the rollers 34 of the carrier plate 33, and a pair of second guide rails 49 disposed above the first guide rails 48 so as to guide the carrier plage 33 by guide grooves 49a being in a slidably engaging condition with the both edges of the carrier plate 33. When a yarn package 4 is mounted on the yarn-receiving rod 35, the flange 36 pushes the expanded portion 43a of the lever 43 so that the hook 41a of the hook lever 41 is projected downward through the cut out portion 33a of the carrier plate 33. Consequently, the hook member 46 of the endless chain 47 is engaged with the hook 41a so that the carrier 30 is positively displaced by the motion of the endless chain 47. To attain a perfect transfer motion of the yarn package 4 from the conveyer 3 to the carrier 30, it is necessary to stop the carrier 30 at its exact working position. To attain this purpose, a non-contact limit switch 51 (FIG. 9) is disposed at a position a little upstream from the exact transfer position along the transfer passage 31c of the conveyer 31. A solenoid 53 is disposed at the exact transfer position along the transfer passage 31c and a stopper 50 is connected to a solenoid rod 53a in such a way that when the solenoid 53 is actuated, the solenoid rod 53a is projected toward the passage of the carrier plate 33 so that the stopper 50 disturbs further forward displacement of the carrier plate 33. To control the working time of the solenoid 53, a conventional timer relay 52 is utilized so as to electrically connect the limit switch 51 with the solenoid 53 as shown in FIG. 9. The transfer motion of the yarn package 4 from the conveyer 3 to the carrier 30 is carried out in a manner similar to the embodiment shown in FIGS. 1, 2 and 3 and, consequently, a detailed explanation thereof is omitted here.

Figure 11:
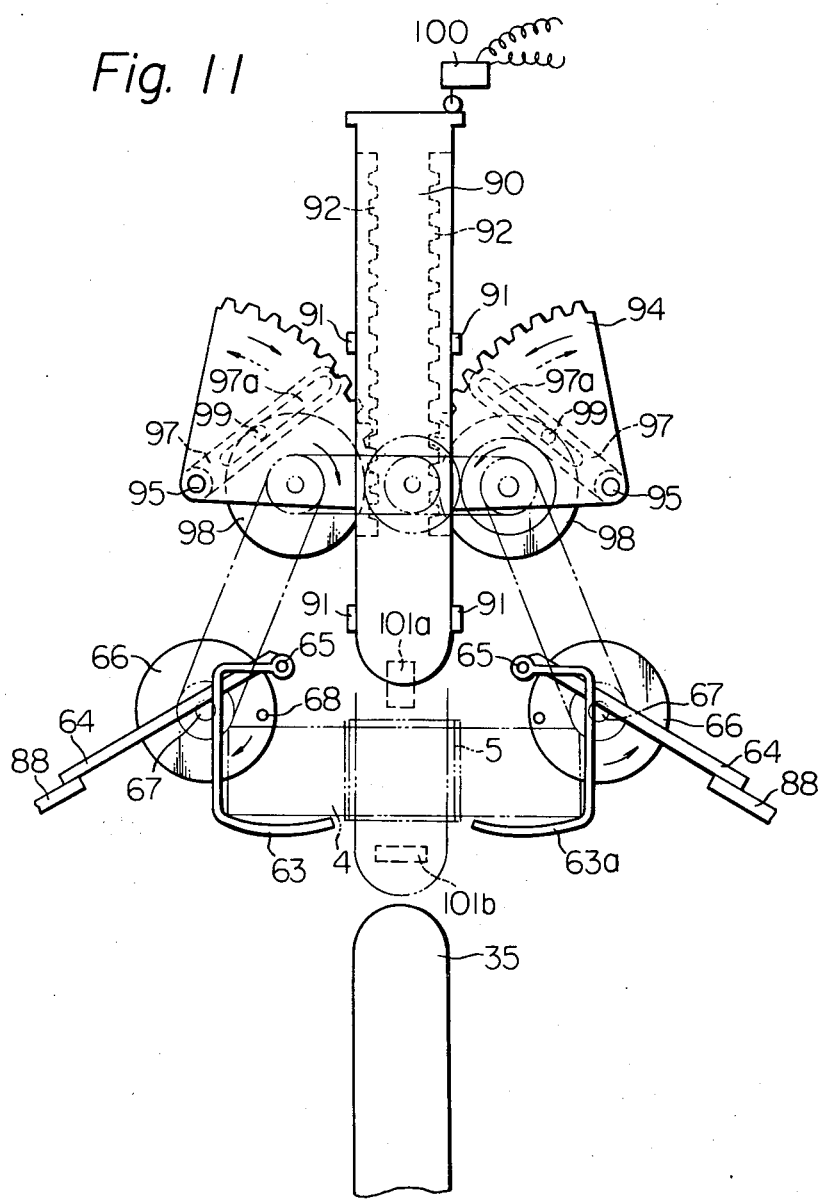
FIG. 11 is a side view of a positioning and transferring means utilized for the transportation devices according to the present invention.
Figure 12:
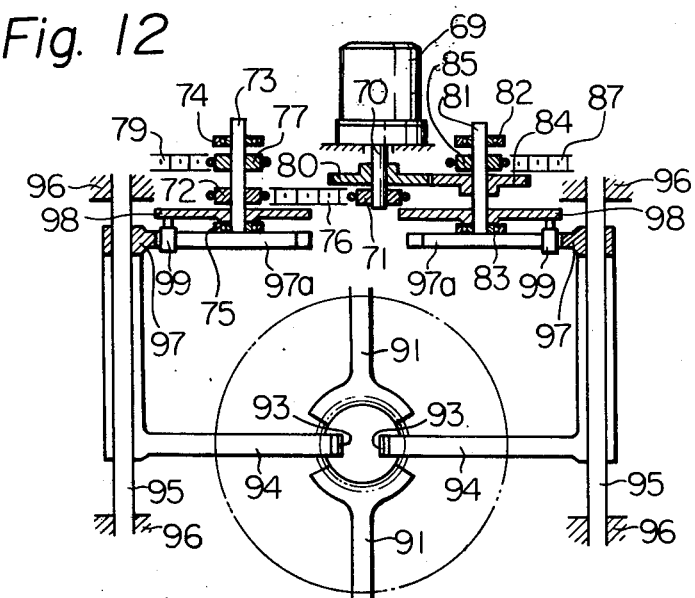
FIG. 12 is a plan view of a mechanism for actuating the positioning and transferring means shown in FIG. 11.
Figure 13:
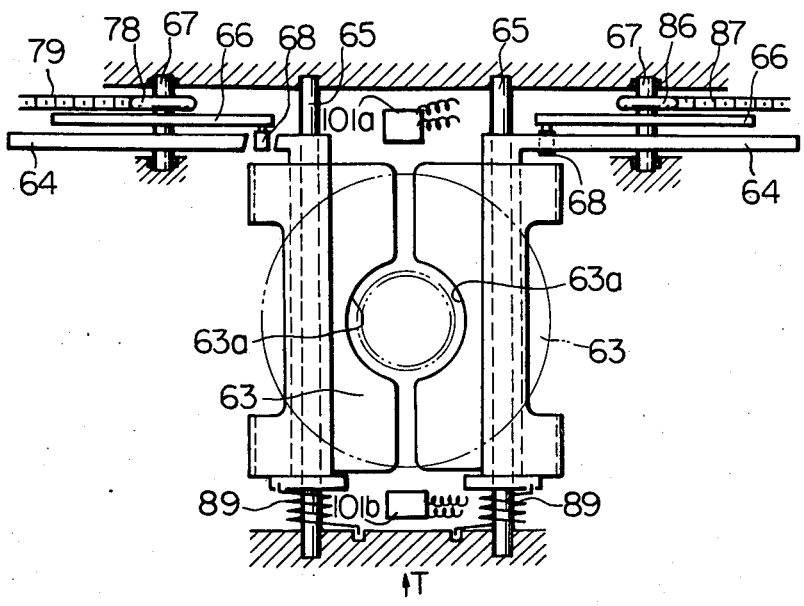
FIG. 13 is a side view of the mechanism shown in FIG. 12.

Another embodiment of the transfer device utilized for the transportation apparatus according to the present invention is shown in FIGS. 11, 12 and 13. The transfer device is provided with a pair of holding plates 63 by which a yarn package 4 is held at a predetermined position. Each holding plate 63 is provided with a semi-circular cut out portion 63a and a lever 64 off-set from the main portion thereof. Each lever 64 is turnably mounted on a corresponding supporting shaft 65. A pair of disks 66 are rigidly mounted on corresponding rotatable shafts 67, and each disk 66 is provided with a roller 68 rotatably mounted thereon at an edge portion thereof. A driving motor 69 is mounted on the frame of the device and one of the shafts 67 (left side in FIG. 13) is driven by a driving mechanism comprising a sprocket wheel 71 rigidly mounted on a motor shaft 70, a sprocket wheel 72 rigidly mounted on a shaft 73 rotatably supported by a pair of bearings 74, 75 rigidly mounted on the frame of the device, an endless chain 76 which transmits the rotation of the sprocket wheel 71 to the sprocket wheel 72, a sprocket wheel 77 rigidly mounted on the shaft 73, a sprocket wheel 78 rigidly mounted on the shaft 67 and an endless chain 79 which transmits the rotation of the sprocket wheel 77 to the sprocket wheel 78. The other shaft 67 (right side in FIG. 13) is driven by a driving mechanism comprising a gear 80 secured on the motor shaft 70, a shaft 81 rotatably supported by a pair of bearings 82, 83 mounted on the frame (not shown) of the device, a gear 84 rigidly mounted on the shaft 81 in such a way that the gear 84 meshes with the gear 80, a sprocket wheel 85 rigidly mounted on the shaft 81, a sprocket wheel 86 rigidly mounted on the shaft 67 and an endless chain 87 which transmits the rotation of the sprocket wheel 85 to the sprocket wheel 86. Each lever 64 is always urged toward a corresponding stationary piece 88 mounted on the frame (not shown) of the device by means of a corresponding spring 89. A guide rod 90 is slidably supported by pairs of guide members 91 and is provided with a pair of racks 92 formed in the respective longitudinal grooves 93 which are formed along the longitudinal axis of the guide rod 90 in a symmetrical condition. The guide members 91 are rigidly mounted on the frame (not shown) of the device. A pair of fan-shaped gears 94 are rotatably mounted on corresponding shafts 95, and each shaft 95 is rigidly supported by a pair of brackets 96 secured to the frame (not shown) of the device. Each fan-shaped gear 94 is provided with a swing lever 97 off-set from an end portion thereof. Each swing lever 97 is provided with a groove 97a. A pair of disks 98 are rigidly mounted on the respective shafts 73 and 81 so that these disks 98 are driven by the driving motor 69 by way of the driving mechanisms which are hereinbefore described. Each disk 98 is provided with a roller 99 rotatably mounted on an edge portion thereof in an engaging condition into the respective grooves 97a of the swing levers 97. Consequently, according to the rotation of the disks 98, the fan-shaped gears 94 are driven by way of the respective swing levers 97, the guide rod 90 is displaced upward or downward along a passage defined by the guide members 91. A limit switch 100 is mounted on a bracket (not shown) secured to the frame (not shown) of the device at a position corresponding to the uppermost position of the top of the guide rod 90 so as to detect the arriving of the guide rod 90. As the guide rod 90 is inserted into the hollow cylindrical bobbin 5 of a yarn package 4, the diameter thereof must be a little smaller than the diameter of the inside cylindrical wall of the bobbin 5. In the above-mentioned embodiment, a portion of the holding plates 63 which supports the yarn package 4 is designed so as to have a cured surface which coincides with a part of the cylindrical surface having a central axis which is common to the respective shafts 65. Consequently, the yarn package 4 can be held at a constant level by the holding plates 63 in a free condition from the turning motion of the holding plates 63.

In the above-mentioned embodiment, the transfer motion of the yarn package 4 from the conveyer belt 3 (see FIG. 1) to the transfer device mentioned above is carried out in a manner similar to the embodiment shown in FIG. 1. That is, in this embodiment, the holding plates 63 which are positioned at their receiving positions which correspond to the waiting position of the endless belt 22 shown in FIG. 1, receive the yarn package 4 from the conveyer belt 3 in a manner similar to the embodiment shown in FIG. 1. To confirm that a yarn package 4 has been transferred from the conveyer belt 3 to the holding plates 63, a photoelectric detector, comprising a light projector 101a and a photocell 101b, is disposed at such positions that the light emitted from the light projector 101a passes along an inclined light passage which passes a receiving position of a yarn package 4 by the holding plates 63 and is received by the photocell 101b if there is not a yarn package 4 on the holding plates 63. As the yarn packages 4 are transferred from the conveyer belt 3 to the holding plates 63 from a direction represented by an arrow T in FIG. 13, the light projector 101a is disposed at a higher level while the photocell 101b is disposed at a lower level so as to not disturb the transfer motion of the yarn package 4 from the conveyer belt 3 to the holding plates 63. To position a yarn package 4 at a correct receiving position on the holding plates 63, it is preferably that the opened spaced defined by the semi-circular cut out portion of the holding plates 63 has a little larger diameter than the peripheral diameter of the cylindrical tube of the yarn package 4 so that, when a yarn package 4 is held by the holding plates 63, the end portion of the bobbin can be engaged into the above-mentioned opened space. The above-mentioned photoelectric detector issues an electric signal to actuate the driving motor 69 when a yarn package 63 shuts out the light beam issued from the light projector 101a. To utilize the above-mentioned transfer device, a transportation device such as shown in FIGS. 6 and 7 is preferably used. However, in this case, the receiving rod 35 of the carrier 30 must be shaped so that it is perpendicular to the carrier plate 33, instead of the curved rod 35 of the embodiment shown in FIGS. 6 and 7.

Figure 14A:
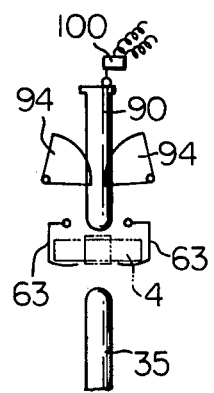
FIGS. 14A, 14B, 14C, 14D, 14E and 14F are explanatory drawings showing the working conditions of the positioning and transferring means shown in FIG. 11.
Figure 14B:
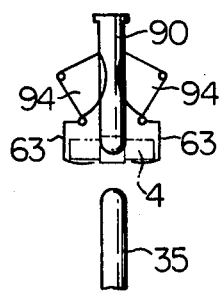
Figure 14C:
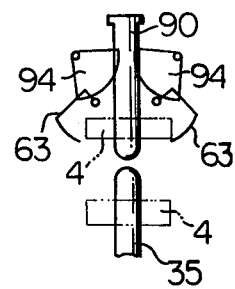
Figure 14D:
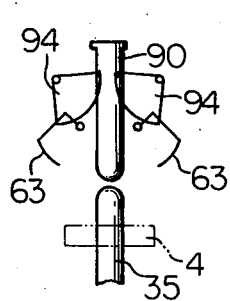
Figure 14E:
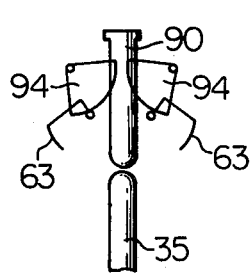
Figure 14F:
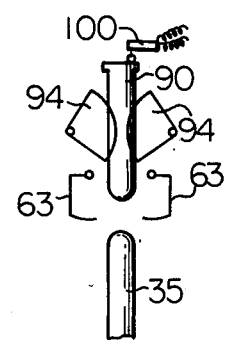
Figure 15:
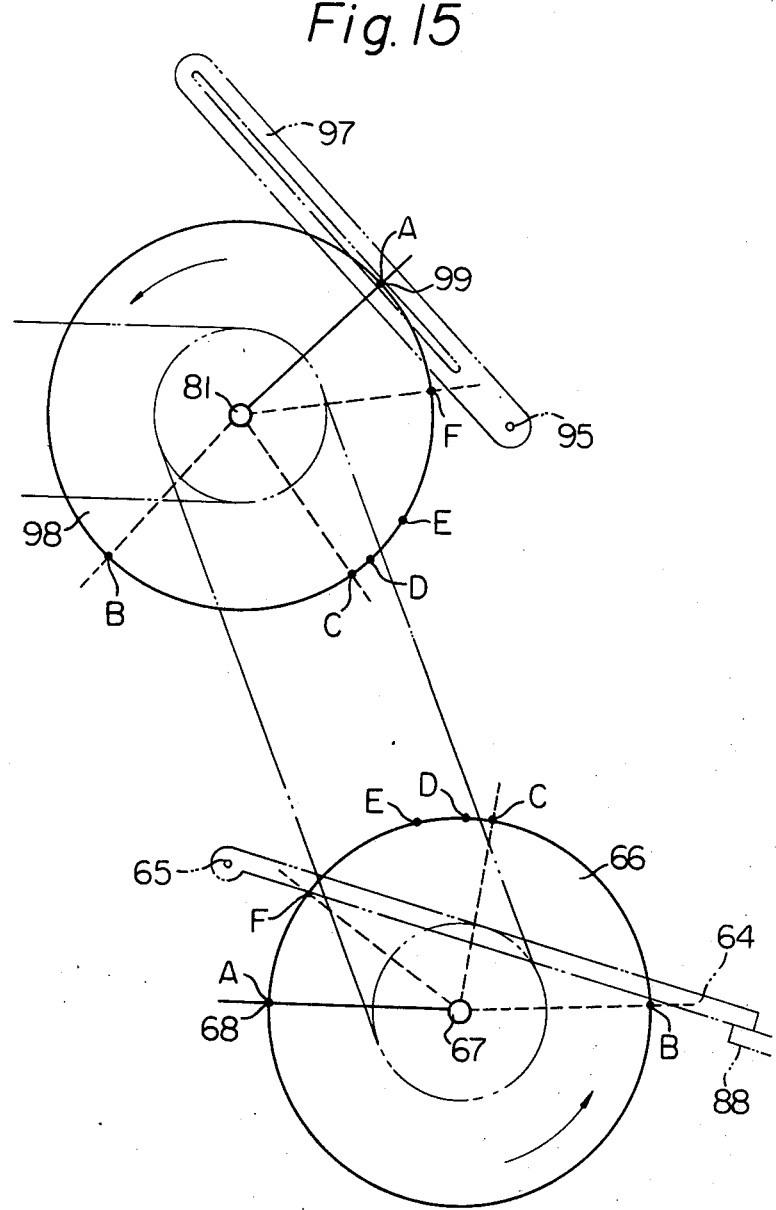
FIG. 15 is a schematic side view of a part of the positioning and transferring means shown in FIG. 11.

The motion of the above-mentioned transfer device is hereinafter illustrated in detail with reference to the schematic drawings shown in FIGS. 14A-14F in case of utilizing the above-mentioned transportation device. When the driving motor 69 is actuated, the disks 66 and 98 are turned so that the guide rod 90 is displaced downward, and the holding plates 63 are still maintained in the package receiving condition until a bottom end portion of the guide rod 90 is inserted into the cylindrical bobbin 5 of the yarn package 4. The above condition is shown in FIGS. 14A and FIG. 14B. When the insertion of the end portion of the guide rod 90 into the bobbin 5 is completed, the holding plates 63 commence their opening motion (FIG. 14C). To attain the above-mentioned working condition, the engaging condition of the rollers 68 with the levers 64 is predetermined. That is, when the rollers 68 engage the respective levers 64, the levers 64 are turned so that the holding plates 63 are turned outwards. The relative position of these elements is shown in FIG. 15 in detail. In FIG. 15, A, B, C, D, E and F represent conditions corresponding to the drawings of FIGS. 14A, 14B, 14C, 14D, 14E and 14F.

Consequently, when the holding plates 63 are turned toward the outsides, as the end of the guide rod 90 has been displaced to a position adjacently facing the top end of the receiving rod 35 of the carrier 30 (FIGS. 6, 7), the yarn package 4 is dropped from the guide rod 90 and mounted on the receiving rod 35 (FIG. 14C). Next, the guide rod 90 commences its displacement upward and the holding plates 63 are turned to their ultimate outside positions (FIGS. 14D and 14E). Then the holding plates 63 commence to turn toward their waiting closed positions and when each lever 64 contacts the stationary piece 20 according to the motion following the motion of the roller 68, the holding plates 63 are returned to their waiting closed positions, and finally, the guide rod 90 is also returned to its waiting position shown in FIG. 14A and the limit switch 100 is actuated by the above-mentioned upward motion of the guide rod 90 so that the motion of the driving motor 69 is stopped. The above-mentioned one cycle motion of the guide rod 90 and the holding plates 63 are repeated each time a yarn package 4 is received by the holding plates 63. As described above, after a yarn package 4 is held at a correct position by the holding plates 63, the guide rod 90 is inserted into the cylindrical tube 5 of a yarn package 4 and then the yarn package 4 is transferred to the receiving rod 35 of a carrier 30 and the transfer of a yarn package 4 from the conveyer belt 3 (FIG. 1) to a carrier 30 (FIG. 6) can be carried out in a satisfactory manner.

What is claimed is:

1. Apparatus for transporting yarn packages formed on cylindrical tubes produced by a textile machine to a successive process comprising, in combination, a transporting device provided with a plurality of receiving rods which are capable of being positioned at a receiving position, and a positioning device for correctly positioning said yarn packages for receipt by said receiving rods of said transportation device, each receiving rod of said transporting device being vertically oriented, said positioning device comprising means for correctly holding said yarn package above said receiving rod of said transporting device and a guide rod displaceably disposed above said holding means, means for displacing said guide rod upward or downward alternately along a vertical path which coincides with an axis of said cylindrical tube of the yarn package held by said holding means and the axis of said receiving rod, means for opening and closing said holding means relative to the motion of said displacing means so that said holding means holds said yarn package until said guide rod is displaced downward and inserted into said cylindrical tube of said yarn package, said holding means is opened when downward motion of said guide rod is completed and said holding means is closed when said yarn package is transferred to said receiving rod and said guide rod is displaced to position above said holding means.

2. Apparatus according to claim 1, wherein said holding means comprises a pair of holding plates, each having a cutout portion adjacent the path of said guide rod, each plate being pivotally mounted for rotational movement about a horizontal axis.

3. Apparatus according to claim 2, wherein said displacing means is mechanically coupled to said opening and closing means, said opening and closing means comprising means for controlling the rotational movement of said plates.

4. Apparatus according to claim 1, wherein said guide rod has a pair of gear racks formed in longitudinal grooves symmetrically disposed on opposite sides of the longitudinal axis of said guide rod.

5. Apparatus according to claim 4, wherein said displacing means includes a pair of sector gears each rotatable about a horizontal axis and engaging a corresponding one of said gear racks.

6. Apparatus according to claim 1, further comprising photoelectric means for detecting the presence of a yarn package held by said holding means, said displacing means being actuated by said photoelectric means.

* * * * *

UNITED STATES PATENT OFFICE
CERTIFICATE OF CORRECTION

Patent No. 4,062,439  Dated December 13, 1977

Inventor(s) Takashi Kato, et al

It is certified that error appears in the above-identified patent and that said Letters Patent are hereby corrected as shown below:

Column 1, line 35: "at" should be --by--.

line 64: "an" should be --a--.

Column 7, line 11: "preferably" should be --preferable--.

Signed and Sealed this

Ninth Day of May 1978

[SEAL]

Attest:

RUTH C. MASON
Attesting Officer

LUTRELLE F. PARKER
Acting Commissioner of Patents and Trademarks